(No Model.)

J. BOSTON.
PULVERIZING HARROW.

No. 518,391.  Patented Apr. 17, 1894.

Witnesses
L. C. Smith
Carl A. Klemm

Inventor
James Boston
by Fenelon B. Brock
Attorney

THE NATIONAL LITHOGRAPHING COMPANY,
WASHINGTON, D. C.

UNITED STATES PATENT OFFICE.

JAMES BOSTON, OF DU BOIS, NEBRASKA.

PULVERIZING-HARROW.

SPECIFICATION forming part of Letters Patent No. 518,391, dated April 17, 1894.

Application filed June 30, 1893. Serial No. 479,275. (No model.)

*To all whom it may concern:*

Be it known that I, JAMES BOSTON, a citizen of the United States, residing at Du Bois, in the county of Pawnee, State of Nebraska, have invented certain new and useful Improvements in Pulverizing-Harrows; and I do declare the following to be a full, clear, and exact description of the invention, such as will enable others skilled in the art to which it appertains to make and use the same, reference being had to the letters of reference marked on the accompanying drawings, which form a part of this specification.

My invention relates to harrows and crushers.

The object of my improvements is to provide a pulverizing and smoothing harrow which shall be simple and cheap to construct and not at all liable to get out of order and very efficient in operation.

The invention consists in the following construction and combination of parts, the details of which will first be fully described and the combinative features of the novelty then set forth and claimed.

Figure 1:
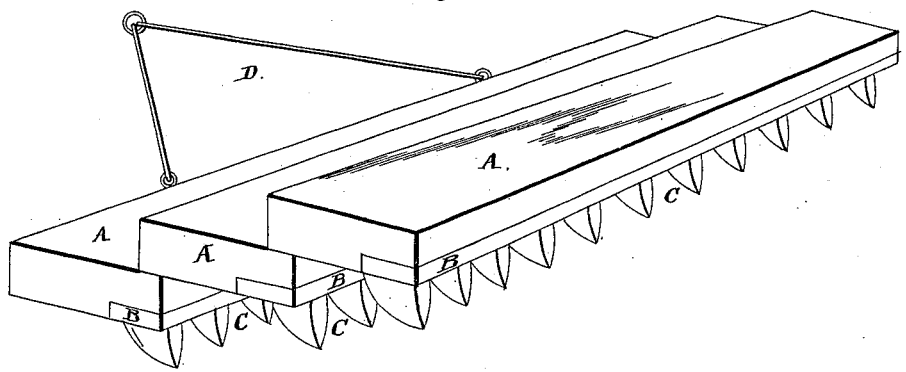
Figure 2:
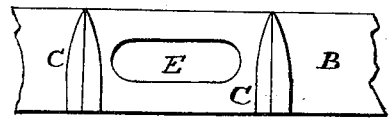

Figure 1 of the drawings represents a perspective view of a machine embodying my invention. Fig. 2 is an enlarged detail plan of one of the metal cross-bars.

A represents three cross timbers arranged in step order the rear under edges of each of which are cut away or rabbeted to receive the cross bars B. These metal cross-bars B have a series of teeth C formed on their under sides preferably of the shape and configuration shown. The teeth C are so arranged that each follows a longitudinal track of its own through the ground, the effect being to intimately crush and pulverize the earth when the harrow is being hauled across the field. The teeth C may be detachably attached to the bar B if desired.

D is the draft attachment.

The timbers A are so arranged as to incline upwardly at their front edges, enabling the machine to easily ride over the clods and inequalities of the earth, crushing and leveling the same.

I prefer to provide my harrow with a seat supported upon a spring standard projecting from the timbers A. I contemplate slotting the bars B by slots E, and passing bolts through the slots into the timbers, whereby a lateral adjustment of each series of teeth C may be had in order to vary the relative paths of travel of the teeth fore-and-aft.

I claim—

The herein described pulverizing harrow, consisting of a series of step timbers, rabbeted at their rear edges, combined with a series of bars fitting said rabbets and having a series of projecting teeth formed thereon and a series of transverse slots in each of said bars whereby an independent and relative lateral adjustment of each bar is secured.

In testimony whereof I affix my signature in the presence of two witnesses.

JAMES BOSTON.

Witnesses:
A. G. ATKINSON,
ORLO HALE.